United States Patent
Birkby et al.

(10) Patent No.: US 8,412,784 B2
(45) Date of Patent: Apr. 2, 2013

(54) STORAGE MODEL FOR MAINTAINING STRUCTURED DOCUMENT FIDELITY

(75) Inventors: Dana B. Birkby, Woodinville, WA (US);
Alexey Galata, Redmond, WA (US);
Naresh Sundaram, Redmond, WA (US);
Karim M. Batthish, Seattle, WA (US);
Vinayak Morada, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 12/396,472

(22) Filed: Mar. 3, 2009

(65) Prior Publication Data

US 2010/0228827 A1    Sep. 9, 2010

(51) Int. Cl.
*G06F 15/16* (2006.01)
*G06F 17/00* (2006.01)
*H04M 1/66* (2006.01)
*H04K 1/00* (2006.01)
*H04L 9/08* (2006.01)

(52) U.S. Cl. ........ 709/206; 455/410; 455/411; 380/276; 380/286; 726/1

(58) Field of Classification Search ........... 709/204–207
See application file for complete search history.

(56) References Cited

U.S. PATENT DOCUMENTS

| | | | |
|---|---|---|---|
| 6,167,402 A | | 12/2000 | Yeager |
| 6,714,950 B1 | | 3/2004 | Ferguson |
| 7,131,116 B1 | | 10/2006 | Krishna |
| 2005/0009502 A1* | | 1/2005 | Little et al. ............... 455/411 |
| 2005/0080930 A1 | | 4/2005 | Joseph |
| 2007/0192416 A1 | | 8/2007 | Gupta |
| 2008/0140783 A1 | | 6/2008 | Williams et al. |
| 2009/0097662 A1* | | 4/2009 | Olechowski et al. ......... 380/286 |

OTHER PUBLICATIONS

"[MS-OXCMAIL]: RFC2822 and MIME to E-Mail Object Conversion Protocol Specification", retrieved at <<http://download.microsoft.com/download/5/D/D/5DD33FDF-91F5-496D-9884-0A0B0EE698BB/%5BMS-OXCMAIL%5D.pdf>>, [MS-OXCMAIL]—v1.03 RFC2822 and MIME to E-Mail Object Conversion Protocol Specification, Released Wednesday, Dec. 3, 2008, pp. 1-106.

"BinaryTree, Inc", "Enhanced Coexistence Solution for Microsoft Exchange and Lotus Notes", retrieved at <<http://www.binarytree.com/website/msg/home.nsf/b9823a8db3a12e7d852568a800638515/697c07ab1daa027e862572bf0070a679/$FILE/Enhanced%20Coexistence%20between%20Notes%20and%20Exchange.pdf>>, Dec. 5, 2008.

* cited by examiner

*Primary Examiner* — Ashok Patel
*Assistant Examiner* — Evans Desrosiers

(57) ABSTRACT

Architecture that introduces storage of an extra (skeleton) property of a document as well as default document properties on a server. In a specific messaging implementation, a MIME skeleton property is stamped on an arriving MIME messages. An incoming MIME message is shredded and all content that is currently saved to MAPI properties continues to be saved. The remaining message content that is not saved to the MAPI properties is stored in the skeleton property. The skeleton property includes all body part headers and any body part content that was not saved as a property on the item by the server. On retrieval of this message by a MIME client, the MIME message is regenerated in full fidelity by using the default set of properties in combination with the skeleton (or extra) property and the stored body content.

21 Claims, 8 Drawing Sheets

```
RECEIVED: FROM DF... BY D...WITH ML.FT SMTP SERVER (TLS)
ID 81; TUE, 9 SEP 2008 16:51:48 -0700
RECEIVED: FROM TK...
...
X-SEN....
X-BL...                                                    402
MIME-VERSION: 1.0
FROM: TEST USER <TEST@USER.COM>
TO: RECIPIENT <RECEIVER@INNOSOFT.COM>
DATE: FRI, 07 OCT 1994 16:15:05 -0700 (PDT)
SUBJECT: A MULTIPART EXAMPLE
    CONTENT-TYPE: MULTIPART/MIXED; BOUNDARY=MIXED
```
```
-- MIXED
CONTENT-TYPE: MULTIPART/ALTERNATIVE;
BOUNDARY="ALTERNATIVE"
                                                           404

-- ALTERNATIVE
CONTENT-TYPE: TEXT/PLAIN; CHARSET=US-ASCII

ALTERNATIVE BODY REPRESENTATIONS.

-- ALTERNATIVE
CONTENT-TYPE: TEXT/ENRICHED; CHARSET=US-ASCII

<BOLD>ALTERNATIVE</BOLD><ITALIC>BODY</
ITALIC>
    <SMALLER>REPRESENTATIONS</SMALLER>
    <IGNOREME>!</IGNOREME>

-- ALTERNATIVE
    CONTENT-TYPE: TEXT/HTML; CHARSET=US-ASCII
```
```
<HTML><BODY>
<P>ALTERNATIVE BODY REPRESENTATIONS </P>   406
</BODY></HTML>
```
```
--MIXED
CONTENT-TYPE: IMAGE/GIF; NAME=PIC1.GIF
FILENAME=PIC1.GIF
CONTENT-ID: <PIC1>                                         408
CONTENT-TRANSFER-ENCODING: BASE64
```
```
R0LGODLHQQBBAPF/
AGZFM23FLQPLCST0OJL165ZBPZRJY8XHSJ3IAZHCWZDHVKTRB52
DNX7NQNTKOXDIMGJCK4WSZ4XWSXPKNM37          414
```
```
--MIXED
CONTENT-TYPE: IMAGE/GIF; NAME=PIC2.GIF
INLINE; FILENAME=PIC2.GIF                                  410
CONTENT-ID: <PIC2>
CONTENT-TRANSFER-ENCODING: BASE64
```
```
+SRKYLULJQLLG4RDTZTTZU7U75KXPPXCDDEZT7ZXZY8N5PPBDD
PJ4+IDVQX3UQFB29VDW8V27JHREETEICNYANJFNRRZSL0NXBOO
XDIMGJCK4WSZ4XWSXPKNM37                    416
```
```
--MIXED--                                                  412
```

*FIG. 4*

STORAGE MODEL FOR MAINTAINING STRUCTURED DOCUMENT FIDELITY

BACKGROUND

Content conversion logic for incoming MIME (multi-purpose Internet mail extensions) messages involves shredding the message and saving select body parts in various MAPI (messaging application programming interface) properties. The "best" body of the message is promoted to the appropriate property and attachments are saved in the attachment table. Body parts that are not supported by MAPI clients are discarded, along with alternative representations of the "best" body in a multipart/alternative block. This process works well for certain MAPI clients for which the current content conversion logic is optimized. However, this creates significant issues for IMAP (Internet message access protocol) and POP (post office protocol) clients which need email in the store to be converted back to MIME before these clients can consume the message.

Converting a message from MIME to MAPI and back to MIME creates two problems for these standards-based clients, that impact performance and message fidelity. With respect to performance, conversion from MAPI to MIME is an expensive process and needs to be carried out each time a standards based client requests information on an email message. Even if only top level headers are requested, the full MAPI-to-MIME conversion takes place. This severely impedes IMAP client performance. With respect to message fidelity, due to the lossy nature of the current content conversion logic, the MIME message the client sees is not the same as the original MIME message that was received by the server. This can result in unpredictable behavior for certain IMAP clients which expect any saved content to be returned exactly as it was stored.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture addresses the problem of improving the fidelity of structured documents (such as messages) stored in and transmitted through (e.g., e-mail) servers that support many different kinds of client applications, while minimizing the impact of storing the additional data to maintain fidelity during any reconstruction for a consuming client or other type of receiving entity.

The architecture involves the storing of an extra property of a document, as well as the default set of document properties on a server. The extra property, also referred to as the skeleton property, includes all body part headers and any data that was previously discarded by the server when saving the document to the datastore. On retrieval of the document, the skeleton property is used in conjunction with the default set of stored properties to build a full fidelity representation of the original document.

In the context of messages, and in particular, a MIME message, the problem of incomplete message reconstruction is solved by the introduction of the MIME skeleton property. When a MIME message is saved to a mailbox that is accessed by a MIME client (a "MIME optimized" mailbox), the MIME skeleton property is stamped on the message. This property includes all body part headers and any body part content that was not saved as a property on the item by message server. On retrieval of this message by a MIME client, the MIME message is generated by using a property for the top level MIME headers in conjunction with the MIME skeleton and the stored body content, to produce a full fidelity representation of the MIME message. The architecture further includes one or more algorithms that govern what data is stored in the skeleton property and determine when the skeleton property is invalidated.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates an example mapping of MIME to MAPI for a subset of item properties.

DETAILED DESCRIPTION

Figure 1:
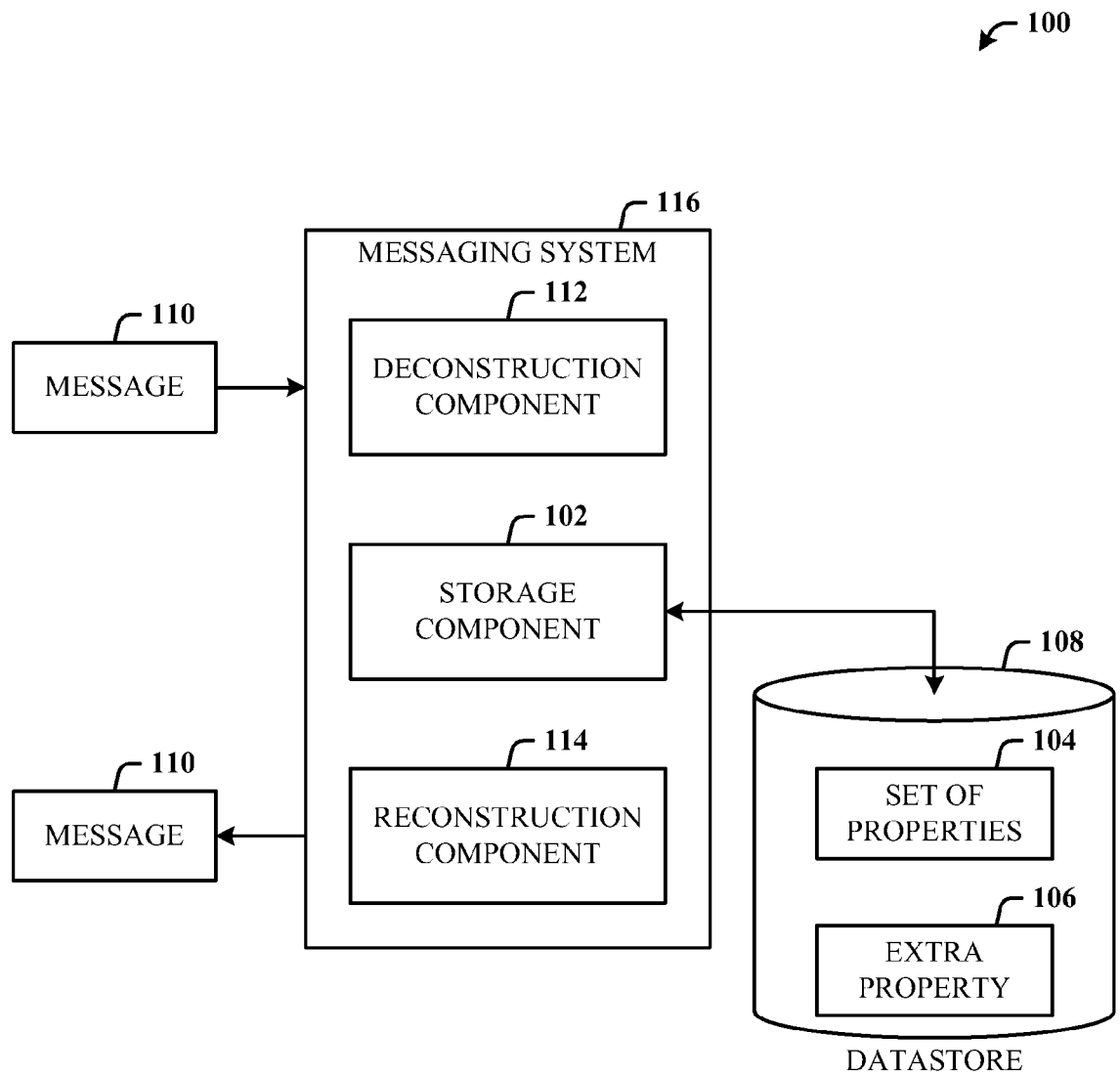
FIG. 1 illustrates a computer-implemented message system for maintaining message fidelity in accordance with the disclosed architecture.

A significant portion of Internet e-mail is transmitted in MIME (multi-purpose Internet mail extensions) format. The MIME format defines messages as having single part content types and multipart types. The IMAP (Internet message access protocol) protocol allows access to separately retrieve individual MIME parts and portions of either individual parts or the entire message. For example, clients can retrieve the text portion of a message without retrieving attached files. Moreover, content is allowed to be streamed as it is being fetched.

In some message server systems, when a MIME message was saved to the store, for MIME-based clients and some parts of the message are decoded and stored in database tables and rows for retrieval from a database such as MAPI (messaging application programming interface). This is an inefficient use of storage, since the bulk of users utilize non-MIME clients which did not require data stored in the MIME stream.

In a later server version only the portions of the MIME message that are used by native (non-MIME) clients were stored. However, this approach created problems for MIME clients because the MIME message that was produced by the server from the limited set of properties that were stored, was significantly different from the original MIME message coming in. Parameters on header body parts were lost, body part content was generated that did not accurately represent the original body, and performance suffered because of the expensive nature of generating MIME from message properties.

In a broad application, the architecture involves the storing of an extra property of a document, as well as the default set of document properties on a server. The extra property, also referred to as the skeleton property, includes all body part headers and any data that was previously discarded by the server when saving the document to the datastore. On retrieval of the document, the skeleton property is used in conjunction with the default set of stored properties to build a full fidelity representation of the original document. Note that although described in the context of messaging, it is to be understood that the architecture and extra property described herein applies generally to a document, of which a message is one example.

In a more specific implementation to messages, the disclosed architecture introduces the MIME extra (or skeleton) property, which is stamped on an arriving MIME message. An incoming MIME message is shredded (parsed) and all content that is currently saved to MAPI properties continues to be saved. The remaining message content that is not saved to the MAPI properties is stored in the skeleton property. The skeleton property includes all body part headers and any body part content that was not saved as a property on the item by the server. On retrieval of this message by a MIME client, the MIME message is regenerated in full fidelity by using the default set of properties in combination with the skeleton (or extra) property and the stored body content.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented message system 100 for maintaining message fidelity in accordance with the disclosed architecture. The system 100 includes a storage component 102 for facilitating the storage of a set of properties 104 and an extra property 106 in a datastore 108 in association with a received message 110 as part of deconstruction of the message 110 by a deconstruction component 112. Note that the storage component 102 can be part of the datastore 108, rather than part of the messaging system 116. A reconstruction component 114 reconstructs the message 110 to full fidelity using the extra property 106 and the set of properties 104 when retrieving the message 110.

The message 110 can be a MIME message deconstructed by the deconstruction component 112 as a MAPI item with the set of properties and a MIME extra property.

The extra property 106 stores body part headers and data not stored in the set of properties 104. The extra property 106 includes top level message headers, body part headers, and body part content not saved as MAPI properties. The storage component 102 also facilitates the storage of message headers to corresponding new properties.

As illustrated, the deconstruction component 112, storage component 102 and reconstruction component 114 are part of a messaging system 116, such as a messaging server that processes e-mail messages, for example. The datastore 108 can be a mailbox store associated with the messaging system 116 to provide efficient storage and retrieval of the message parts and content in the set of properties 104 and the extra property 106.

In a broader implementation, the messaging system 116 is a document system via which a document (e.g., the message 110) is deconstructed and reconstructed based on the set of properties 104 and extra property 106 stored in the datastore 108.

Figure 2:
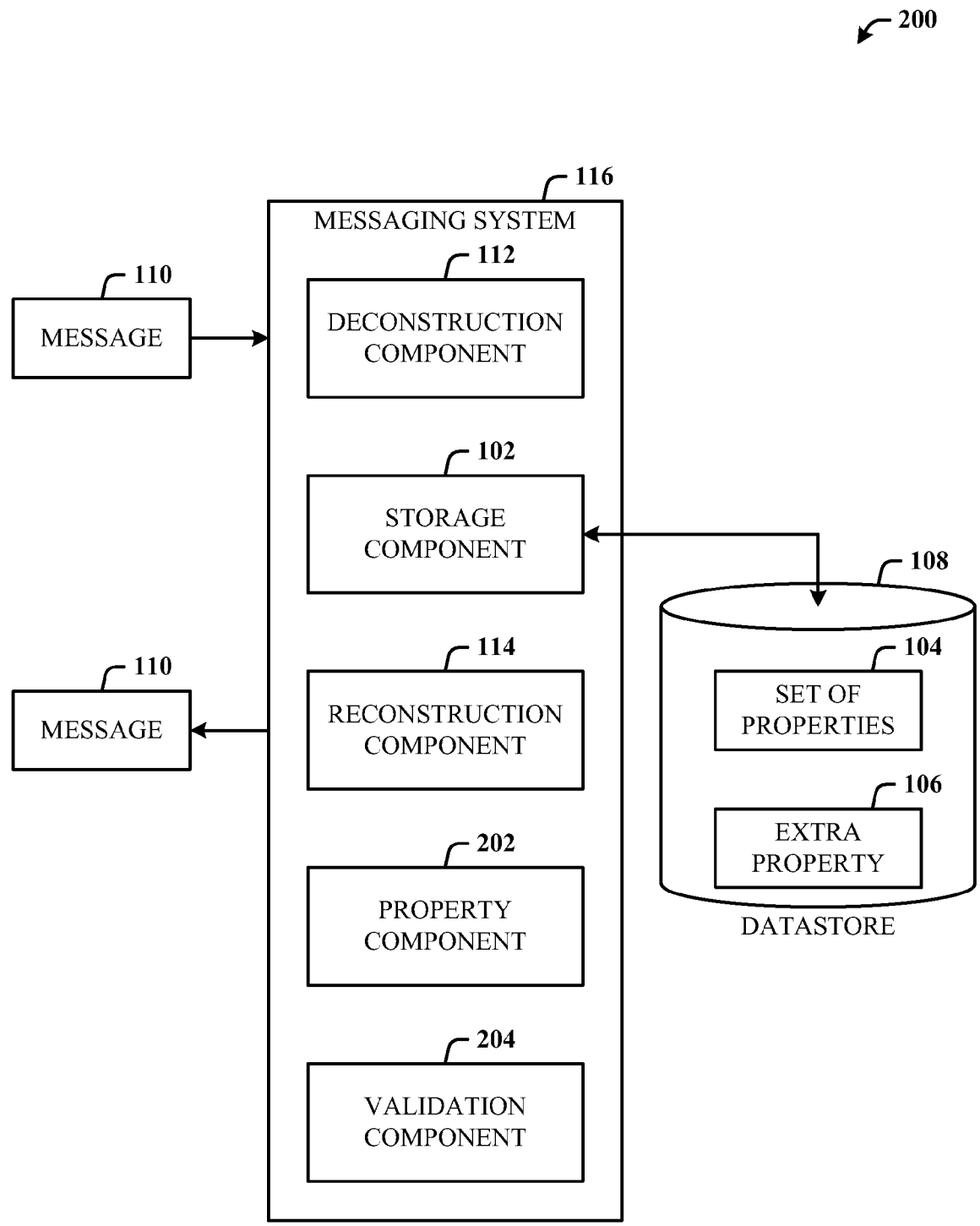
FIG. 2 illustrates an alternative embodiment of a system for maintaining message fidelity.

FIG. 2 illustrates an alternative embodiment of a system 200 for maintaining message fidelity. The system 200 includes the components and entities of the system 100 of FIG. 1, and further includes components for validation and data selection for the properties. Here, the system 200 further includes a property component 202 for determining data to be stored in the extra property. In other words, in the context of improving performance, it is not necessarily the case that all data and content not stored in the set of properties is automatically stored in the extra property. The system 200 can be selective based on the client requesting the message. Additionally, if it is known that the environment in which the system 200 will be deployed is closed to only one type of client, it may be more desirable to save only a subset of the message data/content rather than the all the data/content.

The system 200 further comprises a validation component 204 for discarding the extra property when conversion of the parts of the message 110 after deconstruction cannot be performed. The validation component 204 can further be employed for modifying the extra property 106 based on a change to the message 110 (e.g., an IMAP message) made by a messaging client (e.g., IMAP). Note that the system 200 is not restricted to IMAP clients. Still further, the validation component 204 can be configured to leave the extra property 106 unchanged based on a change to the message (a MAPI message) made by an IMAP client.

Put another way, the system 200 includes the storage component 102 for storing the set of properties 104 and the extra property 106 in association with the received message 110 as part of deconstruction of the message 110, the property component 202 for determining data to be stored in the extra property 106, and the reconstruction component 114 for reconstructing the message 110 to full fidelity using the extra property 106 and the set of properties 104 when retrieving the message 110.

The system 200 can further comprise the validation component 204 for discarding the extra property 106 when conversion of parts of the message 110 cannot be performed. The message 110 can be a MIME message deconstructed as a MAPI item with the set of properties 104 and a MIME extra property. For a MIME message the extra property 106 includes top level message headers, body part headers, and body part content not saved as MAPI properties. The validation component 204 modifies the extra property 106, deletes the extra property 106, or leaves the extra property 106 unchanged based on a change to the message 110 made by a messaging client (e.g., IMAP), where the message is a MAPI message. The validation component 204 can also modify or delete the extra property based on changes made to the message by a non-MIME client. In other words, any change made by any client is processed for validation.

Figure 3:
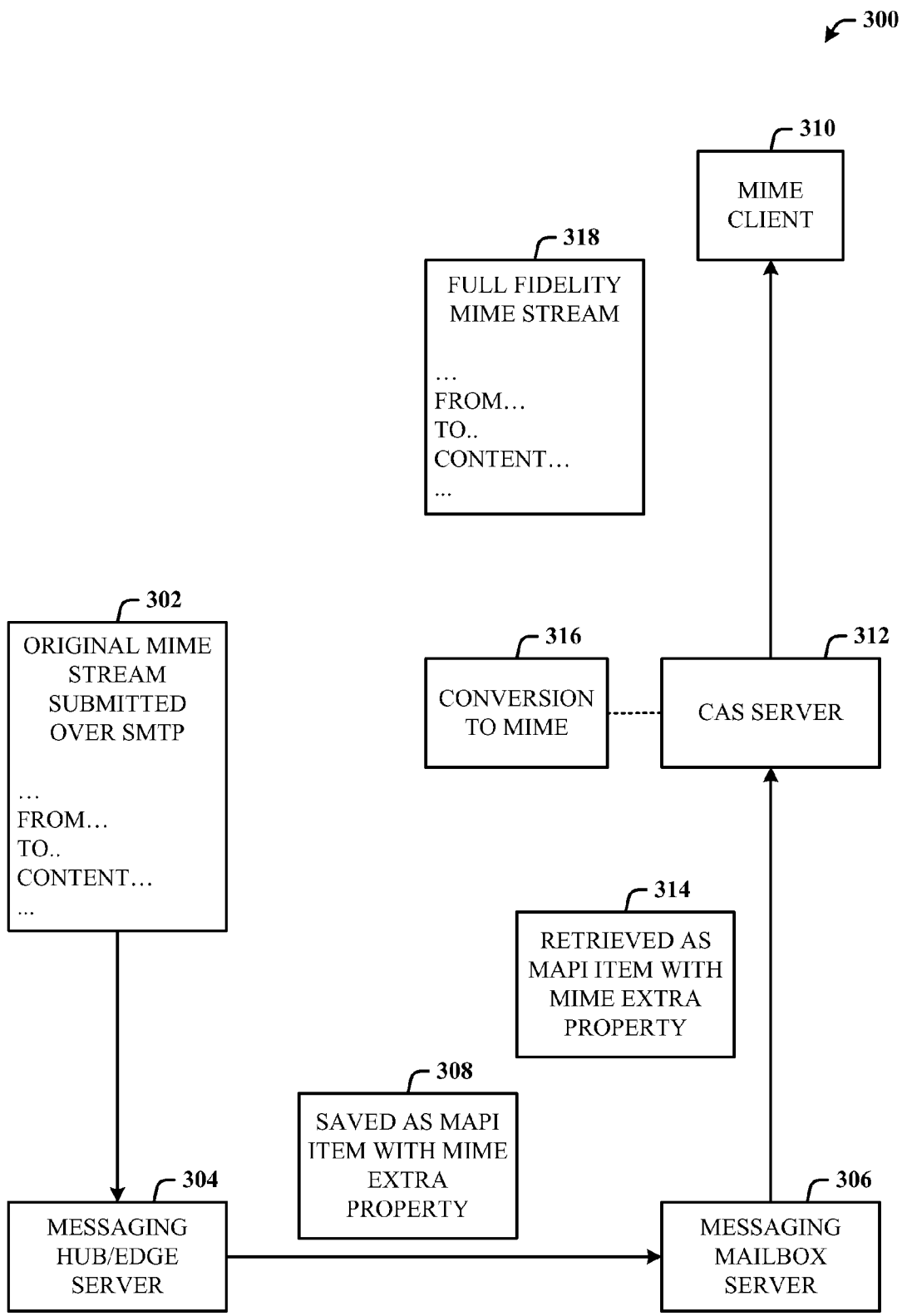
FIG. 3 illustrates a flow diagram for processing a MIME message for full fidelity.

FIG. 3 illustrates a flow diagram 300 for processing a MIME message for full fidelity. An original MIME stream 302 is submitted to a messaging hub/edge server 304 over an SMTP (simple mail transfer protocol) connection. The stream 302 is saved to a messaging mailbox server 306 as a deconstructed MAPI item with a MIME extra property, as indicated at 308. In response to a request by a client 310, a client access server (CAS) 312 requests the message from the mailbox server 306. The CAS server 312 retrieves the message as a MAPI item with the MIME extra property. The CAS server 312 then performs MIME conversion to reconstruct the item and extra properties, as indicated at 316. The client 310 then receives the reconstructed MIME stream with full fidelity, as indicated at 318.

FIG. 4 illustrates an example mapping 400 of MIME to MAPI for a subset of item properties. The MIME extra property is stamped on items whenever a MIME message is saved to the store (e.g., the datastore 108 of FIG. 1, the mailbox server 306 of FIG. 3). The mapping 400 begins by saving first content part 402 in a message header property on the item stored in the mailbox server. The first content part 402 includes a boundary, after which breaks are searched.

Scanning is then performed through the subsequent content to look for breaks (e.g., Mixed, Alternative, etc.). A second content part 404 begins with the MIXED break, and includes internal nesting. The second content part 404 includes a new Content-Type that is Multipart/Alternative and has a subsection. The subsection itself has multiple parts and there are alternative versions of the same thing, followed by the boundary tag again that describes the breaks (Alternative) that follow.

When inside the nesting, the scan searches for Alternative breaks. A first Alternative defines a Content-Type of Text/Plain, which means it is a single part and the part is a plain text representation.

The parts that are tagged describe the character set (charset) the content is in. The next line, Alternative Body Representations, is essentially what the end user sees if the mail client only supports or only understands plain text.

Scanning to the next part, another Alternative break includes Content-Type: Text/Enriched, a more robust alternative representation of the body. The character set indicates US-ASCII. The bold tag and other tags are attributes or elements that basically describe how a client that supports enriched text renders the map.

The next section of the second content part 404 is another Alternative break that is a Content-Type: Text/HTML. Scanning to this point, it can be decided that text/HTML is the richest alternative representation of this part of the message body. Look inside a third content part 406, there is a paragraph (P) tag, a body (Body) tag, an Alternative Body Representations, the part that is saved to PR_HTML. More generally, the third content part 406 can be saved as the "best" body of the message.

At this point, it can be determined that the other parts of the message, a fourth content part 408, a fifth content part 410, and a sixth content part 412, are not desired to be reconstructed at a later time. Accordingly, the fourth content part 408, the fifth content part 410, and the sixth content part 412 are added to the MIME extra property. A tag is then added in the MIME extra property that indicates this alternative body part, or it is understood that an empty alternative body part that includes Text/HTML indicates to go to the "best" body and pull the HTML part out and insert it, if the client ever requests MIME in the future.

To complete this example mapping 400 a next MIXED break found in the fourth content part 408 (following the "best" body part 406) indicates that all of the body parts are done such as the message body presented as the content to the message. This MIXED break indicates that there is another break and an attachment that follows. The content in the fourth content part 408 includes content types (Image/GIF), the file name, a content id, and a content transfer encoding which describes how the attachment has been coded. An attachment 414 associated with the fourth content part 408 is stored in an attachment table on the item, as well as the content id for this content. Similarly, the content in the fifth content part 410 includes content types (Image/GIF), the file name, a content id, and a content transfer encoding which describes how the associated attachment has been coded. An attachment 416 associated with the fifth content part 410 is stored in an attachment table on the item, as well as the content id for this content. The second content part 404, fourth content part 408, fifth content part 410, and a sixth content part 412 are then stored in the MIME extra property.

The existence of the MIME extra property on items in the store significantly improves retrieval times of these messages by MIME clients and also significantly reduces processor cycles on the CAS server 312.

However, given the additional storage cost associated with saving the MIME extra property, it may not be prudent to stamp the property on messages delivered to all mailboxes. Instead, this property is only stamped on delivery of MIME messages to mailboxes of users that actually use MIME clients.

In order to limit the set of mailboxes on which the MIME extra property is stamped, a way of identifying mailboxes that are accessed by MIME clients is by stamping an optimize property (e.g., MIMEOptimized) on the user object (e.g., a network services component).

There can be three settings for the optimize property—default, on, and off. In the default mode, a MIME extra property is stamped on items saved to the mailbox if a MIME client has accessed the mailbox in a specified period of time (e.g., thirty days). As the name denotes, the default mode is enabled by default.

An administrator can override the default mode by explicitly turning MIME optimization on or off for a mailbox. If a mailbox has been explicitly configured as MIME optimized by the administrator, all MIME messages saved to the mailbox will have the MIME extra property stamped on them irrespective of whether or not the mailbox has ever been accessed by a MIME client. If MIME optimization is turned off, MIME extra properties are never stamped on items saved to the mailbox.

Server object consumers will have a property (e.g., isMIMEClient) set to true on mailbox session creation in order for the server object to determine that a MIME client is logging into the mailbox. Each time a MIME client logs into the mailbox, a last time the client accessed the mailbox property (e.g., LastMIMEClientAccessTime) on the mailbox is updated with the time of session creation. This property is used in default mode to determine whether an extra property is to be stamped on messages being saved to the mailbox. On mailbox creation, the value of the LastMIMEClientAccessTime property is set to a date and time minimum.

As a brief summary, inbound e-mail is processed to generate the new MIME extra property, where the generation can be controlled by an optional switch. Typically, modifying the item saved in the store results in the MIME extra property being removed. Outbound messages can cause generation of the MIME extra property when converting from MAPI to MIME and this property does not already exist. Only if the switch is added and the setting specifies that the feature is turned off, will the MIME extra property not be generated.

If the extra property exists, then this property is used to generate the outbound MIME. Other MAPI properties will be used only to fill content missing from the extra property.

When an IMAP client requests the message from the server, the original message is generated by combining the contents of the extra property with stored body part content.

This can be accomplished by reading the skeleton and writing the outbound MIME by combining the contents of the extra property with the saved body parts and attachments.

With respect to the process for MIME round-tripping, on the inbound side, the MIME message is shredded to MAPI properties. The MIME extra property is saved in a new property on the message. The extra property can include all top level message headers, all body part headers, and all body part content that is not already saved in MAPI properties. If there are attachments without a content-ID property, an X-header can be added to each attachment body part in MIME extra property that is missing this field. Additionally, a unique value is generated and saved in the MIME extra property and in the PR_ATTACH_CONTENT_ID property corresponding to the attachment.

On the outbound side, the contents of MIME extra property are combined with the saved "best" body and the message attachments, if any. The PR_ATTACH_CONTENT_ID value and the content-ID in MIME extra property to determine the appropriate location of each attachment in the outbound message. The attachment content is encoded using the Content-Transfer-Encoding value specified in the headers for the attachment in MIME extra property. If the specified Content-Transfer-Encoding is not supported by the server, a default base-64 encoding can be utilized for the attachment content and the value of Content-Transfer-Encoding in MIME extra property and in the outbound message is modified to reflect this change.

With respect to modifications to the MIME extra property, if a MAPI message is modified in any way by a non-MIME client, the MIME extra property is deleted, modified, or be left unchanged depending on the changes made to the message. Changes to the following MAPI message properties that leave the MIME extra property unchanged include a read/unread flag, reminders on messages, and categories. Changes to the following MAPI properties can result in modifications to the MIME extra property include follow-up flags, categories, and importance. Follow-up flags are stored in a property which maps to an X-Message-Flag header in MIME. If this X-header already exists in the MIME extra property then its value can be updated when generating the message outbound. If the header does not exist in the MIME extra property and a flag has been set, then the X-Message-Flag header can be added to the top-level headers of the outbound MIME message.

If a categories flag has been set to false, then the category information is included in a keywords header of the message, using the same logic as described above for follow-up flags.

An importance property maps directly to an Importance MIME header. When generating MIME outbound the importance header can be included and set to the value from the MAPI property.

Changes to any other MAPI properties that affect the MIME structure or content of a message should result in modification of the MIME extra property.

With respect to improving performance, requests for partial MIME (in an IMAP case, for example) message retrieval can be modified to use just a part of the MIME extra property that is requested. If the MIME extra property is not present, fallback can be to the existing logic.

Another improvement includes adding a subset of commonly requested headers to the message view table, so that an IMAP client can retrieve these on each message without having to bind to the item.

Yet another optimization is related to storage. If there are body parts in MIME extra property that can be accurately regenerated from those saved in MAPI properties, those parts can also be removed from MIME extra property. Essentially MIME extra property then includes all the headers of the original message and body part content that is either not saved to MAPI properties or cannot be regenerated from a body part saved in MAPI properties. Examples of such body part data are types such as 'text/xml', 'application/foobar', etc., in a multipart/alternative block.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
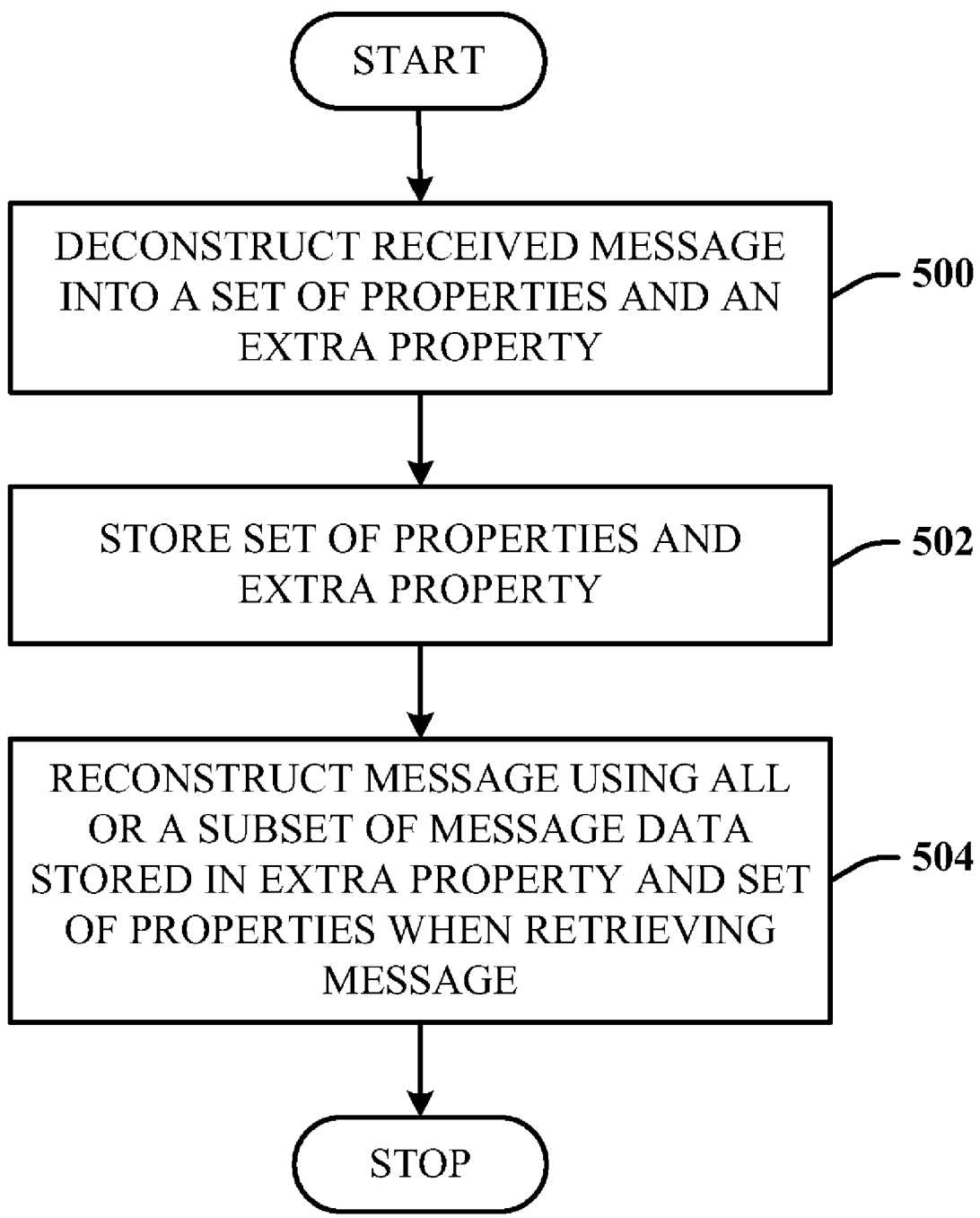
FIG. 5 illustrates a method of managing messages for full fidelity processing.

FIG. 5 illustrates a method of managing messages. At 500, a received message is deconstructed into a set of properties and an extra property. At 502, the set of properties and the extra property are stored. At 504, the message is reconstructed using all or a subset of message data stored in the extra property and the set of properties when retrieving the message.

Figure 6:
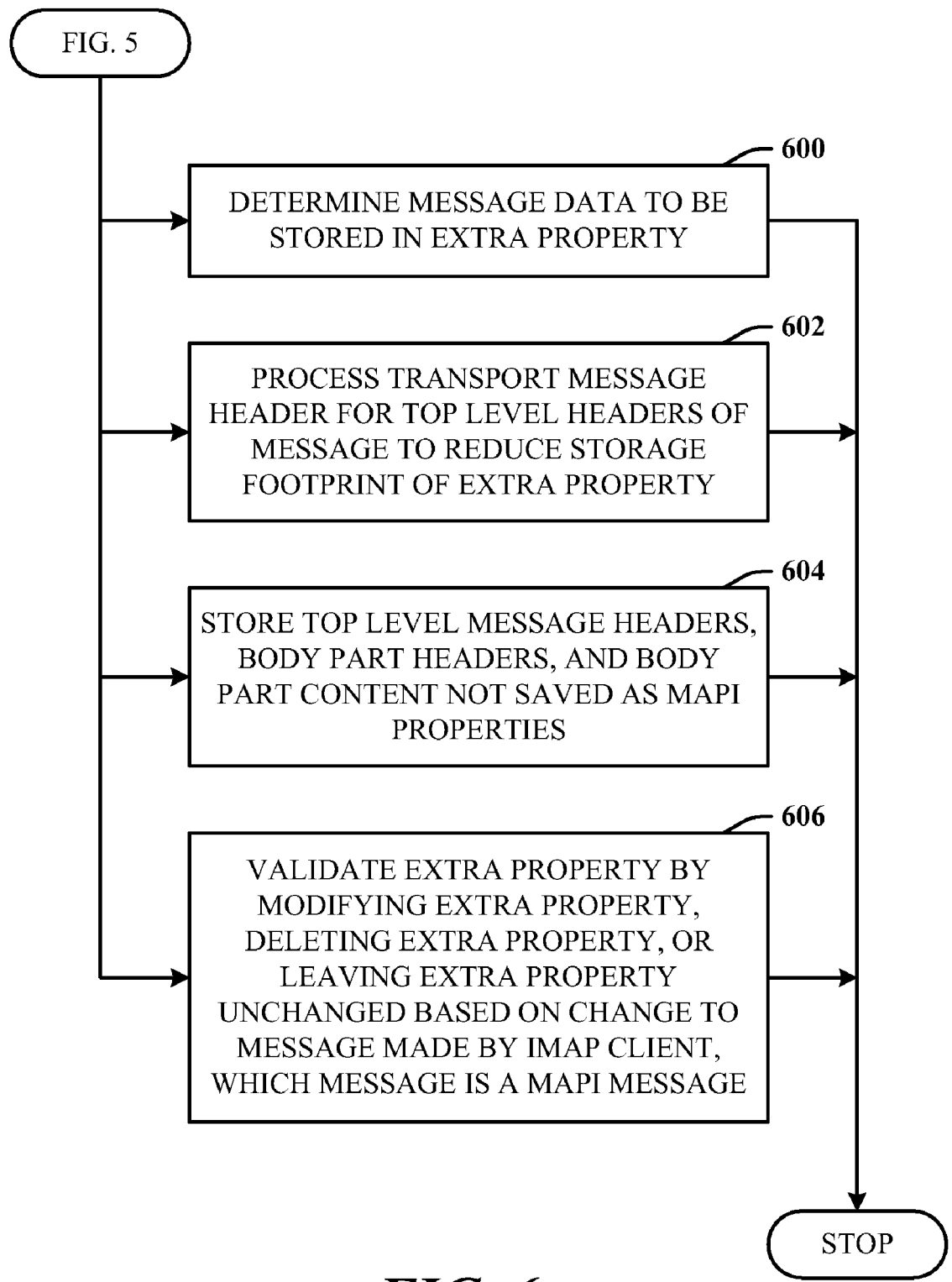
FIG. 6 illustrates additional acts that can be employed in the method of FIG. 5.

FIG. 6 illustrates additional acts that can be employed in the method of FIG. 5. At 600, message data to be stored in the extra property is determined. At 602, a transport message header for top level headers of the message is processed to reduce the storage footprint of the extra property. At 604, top level message headers, body part headers, and body part content not saved as MAPI properties are stored. At 606, the extra property is validated by modifying the extra property, deleting the extra property, or leaving the extra property unchanged based on a change to the message made by an IMAP client, which message is a MAPI message. The message can be a MIME message deconstructed as a MAPI item with the set of properties and a MIME extra property.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
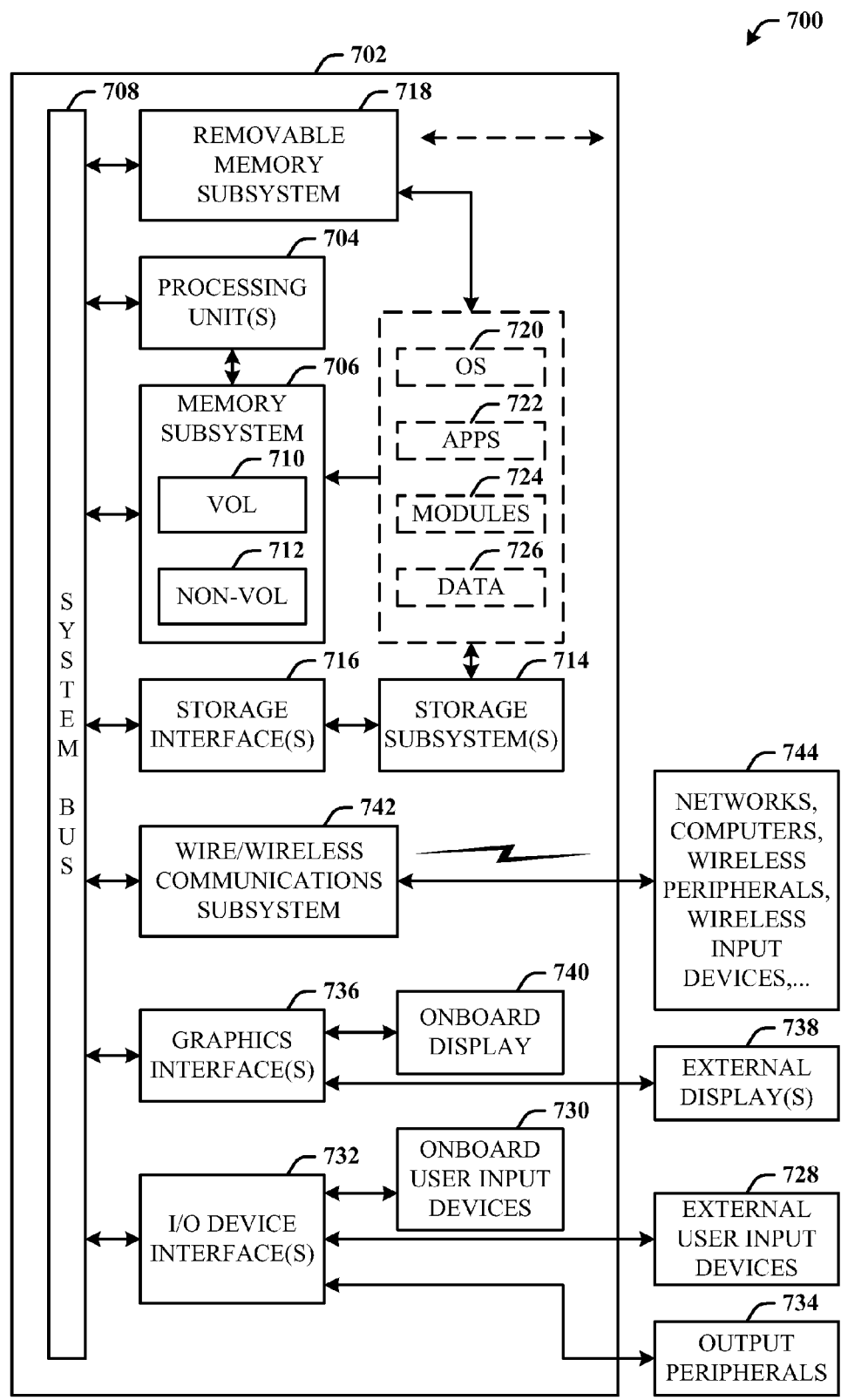
FIG. 7 illustrates a block diagram of a computing system operable to execute full fidelity message processing in accordance with the disclosed architecture.

Referring now to FIG. 7, there is illustrated a block diagram of a computing system 700 operable to execute full fidelity message processing in accordance with the disclosed architecture. In order to provide additional context for various aspects thereof, FIG. 7 and the following discussion are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the memory subsystem 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a removable memory subsystem 718 (e.g., flash drive form factor technology), and/or the storage subsystem(s) 714 (e.g., optical, magnetic, solid state), including an operating system 720, one or more application programs 722, other program modules 724, and program data 726. Where the computer 702 is a message server, the one or more application programs 722, other program modules 724, and program data 726 can include the system 100 of FIG. 1, the system 200 of FIG. 2, the processes associated with FIG. 3, the parsing and storage associated with the example mapping of FIG. 4, and the methods illustrated in FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile media, removable and non-removable media. For the computer 702, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP) using logical connections via a wired/wireless communications subsystem 742 to one or more networks and/or other computers. The other computers can include workstations, servers, routers, personal computers, microprocessor-based entertainment appliance, a peer device or other common network node, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or has other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
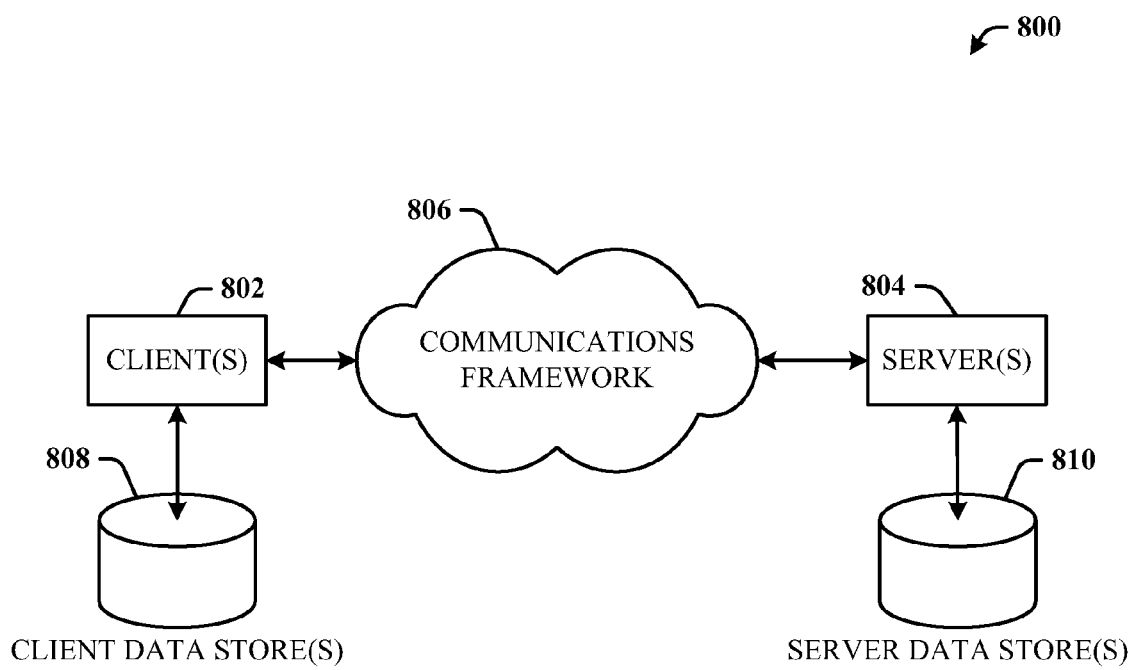
FIG. 8 illustrates a schematic block diagram of a computing environment for full fidelity message processing.

Referring now to FIG. 8, there is illustrated a schematic block diagram of a computing environment 800 for full fidelity message processing. The environment 800 includes one or more client(s) 802. The client(s) 802 can be hardware and/or software (e.g., threads, processes, computing devices). The client(s) 802 can house cookie(s) and/or associated contextual information, for example.

The environment 800 also includes one or more server(s) 804. The server(s) 804 can also be hardware and/or software (e.g., threads, processes, computing devices). The servers 804 can house threads to perform transformations by employing the architecture, for example. One possible communication between a client 802 and a server 804 can be in the form of a data packet adapted to be transmitted between two or more computer processes. The data packet may include a cookie and/or associated contextual information, for example. The environment 800 includes a communication framework 806 (e.g., a global communication network such as the Internet) that can be employed to facilitate communications between the client(s) 802 and the server(s) 804.

Communications can be facilitated via a wire (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented message system, comprising:
a processor for executing computer-executable instructions; and
memory storing computer-executable instructions for:
deconstructing a received MIME (multi-purpose Internet mail extensions) message that is to be stored in a mailbox configured for access by a MIME client, wherein the message is deconstructed into a set of properties that can be retrieved by a non-MIME client and a MIME property that is not included in the set of properties;
storing the set of properties and the MIME property in association with storing the message in the mailbox, the set of properties storing message data that is supported by the non-MIME client, the MIME property storing message data that was not stored in the set of properties; and
reconstructing the message to full fidelity using the MIME property and the set of properties in response to the MIME client accessing the mailbox and retrieving the message.

2. The system of claim 1, wherein:
the message is deconstructed into MAPI (messaging application programming interface) properties; and
the MIME property stores message data which is not saved as a MAPI property.

3. The system of claim 1, wherein the memory further stores computer-executable instructions for:
determining message data to be stored in the MIME property.

4. The system of claim 1, wherein the MIME property stores message data comprising body part headers not stored in the set of properties.

5. The system of claim 4, wherein the MIME property stores message data comprising top level message headers and body part content not stored in the set of properties.

6. The system of claim 1, wherein the memory further stores computer-executable instructions for:
discarding the MIME property when conversion of parts of the message cannot be performed.

7. The system of claim 1, wherein the memory further stores computer-executable instructions for:
modifying the MIME property based on a change to the message data stored in the set of properties made by the non-MIME client.

8. The system of claim 1, wherein the memory further stores computer-executable instructions for:
leaving the MIME property unchanged based on a change to the message data stored in the set of properties made by the non-MIME client.

9. The system of claim 1, wherein:
the MIME property is saved in a new property on the MIME message; and
a message header is stored to the new property.

10. A computer-implemented message system, comprising:
a processor for executing computer-executable instructions; and
memory storing computer-executable instructions for:
storing a set of MAPI (messaging application programming interface) properties and a MIME (multi-purpose Internet mail extensions) property in association with a received MIME message as part of deconstruction of the MIME message based on the set of MAPI properties, the MIME property including message data that was not stored as a MAPI property;
determining message data to be stored in the MIME property; and reconstructing the MIME message to full fidelity using the MIME property and the set of MAPI properties when retrieving the MIME message for a MIME client.

11. The system of claim 10, wherein the memory further stores computer-executable instructions for:
discarding the MIME property when conversion of parts of the MIME message cannot be performed.

12. The system of claim 10, wherein:
the MIME message is deconstructed as a MAPI item; and
the MAPI item is stored with the set of MAPI properties and with the MIME property as an extra property of the MAPI item.

13. The system of claim 10, wherein the MIME property includes top level message headers, body part headers, and body part content not saved as MAPI properties.

14. The system of claim 10, wherein the memory further stores computer-executable instructions for:
modifying the MIME property, deleting the MIME property, or leaving the MIME property unchanged based on a change to a MAPI property made by a non-MIME client.

15. A computer-implemented method of managing messages, comprising:
deconstructing a received MIME (multi-purpose Internet mail extensions) message that is to be stored in a mailbox configured for access by a MIME client, wherein the message is deconstructed into a set of properties that can be retrieved by a non-MIME client and a MIME property that is not included in the set of properties;
storing the set of properties and the MIME property in association with storing the message in the mailbox, the set of properties storing message data that is supported by the non-MIME client, the MIME property storing message data that was not stored in the set of properties; and
reconstructing the message to full fidelity using the set of properties and all or a subset of the message data stored in the MIME property in response to the MIME client accessing the mailbox and retrieving the message.

16. The method of claim 15, further comprising determining message data to be stored in the MIME property.

17. The method of claim 15, further comprising processing a transport message header for top level headers of the message to reduce storage footprint of the MIME property.

18. The method of claim 15, wherein the MIME property stores top level message headers, body part headers, and body part content not saved as MAPI (messaging application programming interface) properties.

19. The method of claim 15, further comprising validating the MIME property by modifying the MIME property, deleting the MIME property, or leaving the MIME property unchanged based on a change to the message data stored in the set of properties made by the non-MIME client.

20. The method of claim 15, wherein:
the message is deconstructed into MAPI (messaging application programming interface) properties; and
the MIME property for stores message data which is not saved as a MAPI property.

21. A computer-readable storage device storing computer-executable instructions implementing the method of claim 15.

* * * * *